United States Patent
Mohri

[15] 3,699,994
[45] Oct. 24, 1972

[54] LINE PRESSURE REGULATOR VALVE
[72] Inventor: Yohichi Mohri, Yokohama, Japan
[73] Assignee: Nissan Motor Company, Limited, Kanagawa-ku, Yokohama Japan
[22] Filed: Jan. 26, 1971
[21] Appl. No.: 109,832

[30] Foreign Application Priority Data
Jan. 30, 1970 Japan ..................45/7750

[52] U.S. Cl. ..................137/115, 74/863, 74/867
[51] Int. Cl. ..................B60k 17/00, G05d 11/00
[58] Field of Search ........137/115; 74/863, 864, 867, 74/868, 869

[56] References Cited
UNITED STATES PATENTS

| | | |
|---|---|---|
| 3,546,973 | 12/1970 | Ohie et al. ..................74/868 |
| 3,561,296 | 2/1971 | Iijima ..........................74/864 |
| 3,563,115 | 2/1971 | Iijima et al. ..................74/864 |
| 2,568,528 | 9/1951 | Welte ........................137/115 |
| 3,400,613 | 9/1968 | Johnson et al. ..............74/869 |
| 3,454,031 | 7/1969 | Kaptur ......................137/115 |

*Primary Examiner*—M. Cary Nelson
*Assistant Examiner*—David J. Zobkiw
*Attorney*—John Lezdey

[57] ABSTRACT

A line pressure regulator valve for regulating a line pressure in a hydraulic control system for an automotive automatic power transmission, wherein a valve spool is adapted to move for initially allowing a relatively high rate of fluid flow to servo motors actuating friction elements and subsequently decreasing the rate of fluid flow to the servo motors with the line pressure concurrently increased whereby a gradual engagement of the friction elements is established to provide smooth shifting between a plurality of gear ratios.

4 Claims, 3 Drawing Figures

LINE PRESSURE REGULATOR VALVE

This invention relates to a hydraulic control system for an automotive automatic power transmission, and more particularly to a line pressure regulator valve for regulating a line pressure in the hydraulic control system of the power transmission.

An automatic power transmission used in motor vehicles commonly includes a plurality of friction elements, such as friction clutches and brakes, to provide a plurality of gear ratios. To perform smooth shifting between the gear ratios, it is desirable to change a torque capacity of the friction elements in accordance with the variation in engine loads. The required torque capacity increases as the engine load increases, and it must be relatively great at starting or during low speed driving and relatively small during high speed driving. Since the torque capacity of the friction element depends on the level of a line pressure to be utilized, smooth engagement of the friction elements can be accomplished by varying the line pressure in proportion to the engine load. To effect gear shifting more smoothly, it is also desirable to have the friction elements coupled gradually be initially introducing a relatively high fluid flow to the friction elements and subsequently a relatively low fluid flow to the friction elements with the line pressure increased.

A regulator valve is conventionally used to control the line pressure in response to a carburetor throttle pressure, which is produced in accordance with the variation in an intake manifold vacuum of the engine, so as to decrease the line pressure for thereby providing smooth engagement of the friction elements. One of the principal disadvantages resulting from the provision of such regulator valve is the difficulty in accomplishing a smooth engagement of the friction elements because the line pressure is maintained constant just before or during the coupling of the friction elements. In another prior practice, an accumulator is utilized for precluding a rapid increase in the level of the line pressure to be applied to the friction elements thereby to prevent the shocks that would otherwise occur during shifting from one speed to another. During coupling of the friction elements, however, the line pressure is unrelated with the throttle pressure, with the result that the line pressure is prevented from varying in accordance with the output torque of the engine. Moreover, the accumulator should be provided on each of the friction clutches and brakes, resulting in a complicated construction of the hydraulic circuit.

It is, therefore, an object of this invention to provide an improved regulator valve for an automatic power transmission which is adapted to effect streamlined engagement of a friction element whereby the gear ratios can be shifted smoothly.

It is another object of this invention to provide a line pressure regulator valve which is simple in construction and reliable in operation.

Figure 1:
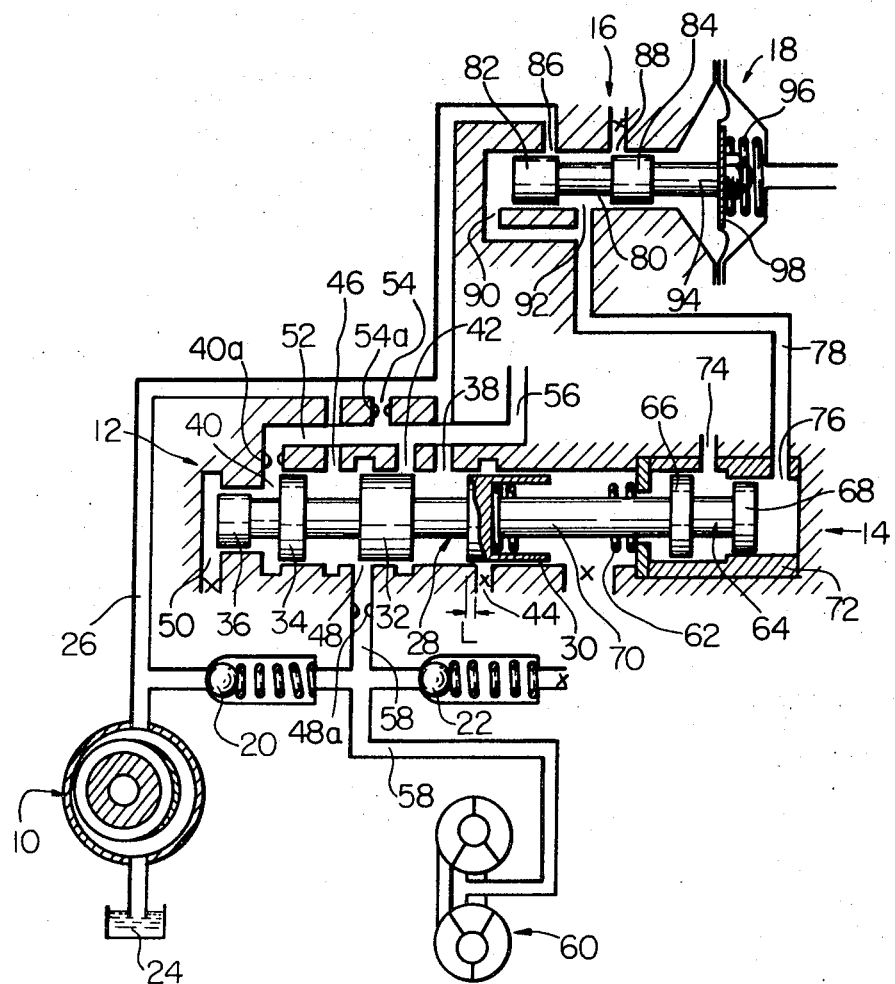
FIG. 1 is a schematic view of a line pressure control system incorporating a line pressure regulator valve according to this invention.

Referring now to FIG. 1, there is schematically illustrated part of a hydraulic control system for an automotive automatic power transmission of the motor vehicle driven by an engine having an intake manifold, the hydraulic control system being shown as incorporating a line pressure regulator valve according to the invention. As shown, the hydraulic control system includes source of pressurized fluid 10, a line pressure regulator valve 12, an amplifier valve 14, a throttle valve 16 associated with a diaphragm assembly 18 and relief valves 20 and 22.

The source of pressurized fluid such as an oil pump 10, which may be of any suitable construction, is adapted to supply a fluid under pressure from a sump 24 to a pressurized fluid supply conduit 26. The fluid pressure supply conduit 26 is connected to the line pressure regulator valve 12 which in turn is connected to control or servo devices, not shown, for actuating the friction elements to effect shifting between the gear rations in the power transmission.

The line pressure regulator valve 12 includes a slidable valve spool 28 having first, second, third and fourth lands 30, 32, 34 and 36 and which serve in the manner as will be described hereinafter in detail. The regulator valve 12 has first and second inlets 38 and 40 which communicate with the source 10 of pressurized fluid through the pressurized fluid supply conduit 26, an outlet 42 and a drain 44 to discharge an excess of fluid therethrough. Indicated at 46 is an inlet which communicates with the pressurized fluid supply conduit 26. The inlet 46 selectively communicates with an outlet 48. Indicated at 50 is drain from which an excess of fluid is discharged off. The outlet 42 communicates with a conduit 52, which in turn communicates with the pressurized fluid supply conduit 26 through a conduit 54 and which leads to a line pressure conduit 56. The outlet 48 which has a flow restriction 48a communicates with a conduit 58, which in turn communicates with a hydrodynamic torque converter 60. The first land 30 of the valve spool 28 serves to vary the degree of fluid communication between the first inlet 38 and the drain 44 for varying the level of pressurized fluid to be delivered to the outlet 42. The second land 32 of the valve spool 28 serves to vary the degree of fluid communication between the first inlet 38 and the outlet 42 for varying the flow rate of pressurized fluid to be delivered to the line pressure conduit 56. A spring 62 is provided for biasing the valve spool 28 leftwardly of the drawing. In the shown condition, the valve spool 28 assumes the position where the force produced by the fluid pressure and acting on the differential area between the third and fourth lands 34 and 36 balances with an opposing force of the spring 62.

As one of the important features of this invention, the regulator valve 12 is so constructed and arranged as to allow initially a relatively high fluid flow rate to the friction elements and to subsequently decrease the fluid flow rate with a concurrent increase in the fluid pressure on the friction elements for thereby bringing about a gradual engagement of the friction elements to provide smooth shifting between the gear ratios. For this purpose, first and second flow restrictions 40a and 54a are provided for restricting the flow of line pressure to be supplied to the friction elements to slow down the rate of application of the friction element for thereby effecting a gradual engagement of the friction elements. More particularly, the first flow restriction 40a is provided in the second inlet 40 of the regulator valve 12 for slowly applying the fluid pressure to the differential area between the third and fourth lands 34 and 36 to move the valve spool 28 rightwardly just after the valve spool 28 has been moved leftwardly by the action of the amplifier valve 14. Thus, the line pressure increases rapidly just before the friction elements are coupled. The second flow restriction 54a is provided in the conduit 54 communicating with the conduits 26 and 52 and functions to restrict the flow of fluid to be supplied to the conduit 52 thereby to gradually increase the line pressure in the line pressure conduit 56 communicating with the servo devices for thereby effecting a gradual engagement of the friction elements to provide smooth shifting of the gear ratios.

The amplifier valve 14 includes a slidable valve spool 64 having spaced lands 66 and 68. On the valve spool 64 is mounted a push rod 70 which cooperates with the land 36 of the regulator valve 12 to increase the line pressure in the line pressure conduit 56. The valve spool 64 is slidably disposed in a casing 72 which has ports 74 and 76. The port 74 communicates with suitable ports of the hydraulic control system not shown, while the port 76 communicates through a conduit 78 with the throttle valve 16.

The throttle valve 16 includes a slidable valve spool 80 having spaced lands 82 and 84 and a plurality of ports 86, 88, 90 and 92. The port 86 communicates with the ports 38 and 46 of the regulator valve 12 through the conduit 26. The port 88 is a drain port. The ports 90 and 92 communicate with each other which in turn communicate with the conduit 78 communicating with the amplifier valve 14. On the land 84 is mounted a push rod 94 associated with the diaphragm assembly 18. The diaphragm assembly 18 includes a spring 96 and a diaphragm member 98 coacting with the push rod 94. The diaphragm assembly 18, which may be of any suitable construction, communicates with the intake manifold of the engine (not shown).

The relief valve 20 is disposed between the conduits 26 and 58 and assumes a closed position during normal operation of the hydraulic control system. The relief valve 22, which is in communication with the conduit 58, prevents an excessive supercharging of the torque converter circuit. The relief valve is so designed as to become uncovered when the pressure of the torque converter circuit reaches a predetermined value.

The throttle valve 16 functions to produce a throttle pressure in accordance with the variation in the intake manifold vacuum of the engine. When the intake manifold vacuum is elevated, the diaphragm member 98 is moved rightwardly against the force of the spring 96 to cause the valve spool 80 to move in the same direction, thereby increasing the degree of communication between the ports 88 and 92. Simultaneously, the degree of communication between the ports 86 and 92 decreases and the fluid pressure progressively decreases. In this instance, the fluid pressure acting on the end of the land 82 is decreased, so that the valve spool 80 is moved leftwardly and assumes the position where the force produced by the fluid pressure and acting on the end of the land 82 balances with the opposing force acting on the push rod 94. As the intake manifold vacuum decreases, the push rod 94 and accordingly the valve spool 80 are moved leftwardly by the force of the spring 96 so that the port 86 communicates with the port 92 while the communication between the ports 88 and 92 is blocked. Consequently, the fluid pressure in the conduit 78 increases, so that the valve spool 80 is then moved rightwardly and assumes the position where the force acting on the end of the land 82 balances with the force acting on the push rod 94. The fluid pressure in the conduit 78 is thus modulated in accordance with the variation in the intake manifold vacuum of the engine and is passed to the port 76 of the amplifier valve 14 for varying the line pressure.

When the output torque of the engine is great, the intake manifold vacuum is so low that the push rod 94 and accordingly the valve spool 80 are moved leftwardly by the force of the spring 96 thereby to increase the fluid pressure in the conduit 78. The fluid pressure thus produced is then distributed to the port 76 and applied to the land 68 of the amplifier valve 14, thereby moving the valve spool 64 leftwardly to cause the valve spool 28 to move in the same direction. In this instance, the outlet 42 communicates with the first inlet 38 so that the fluid pressure supplied from the oil pump 10 is passed through the line pressure conduit 56 over to the servo devices for actuating the friction elements. Simultaneously, the fluid pressure in the conduit 52 is also admitted through the first flow restriction 40a to the second inlet 40 and acts on the differential area between the third and fourth lands 34 and 36 thereby moving the valve spool 28 rightwardly to block the outlet 42.

Figure 2:
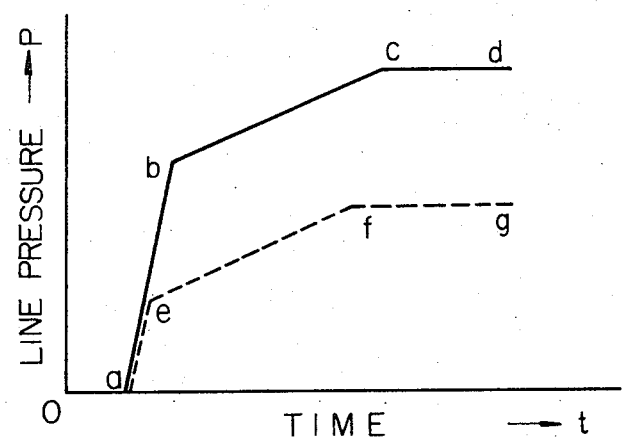
FIG. 2 is a graphic representation of examples of the line pressure attainable by the use of the regulator valve shown in FIG. 1.

The degree of communication between the outlet 42 and the first inlet 38 is initially rapidly increased by the action of the amplifier valve 14, so that the line pressure passed to the conduit 56 varies in a manner following the line segment $a-b$ of the graph illustrated in FIG. 2. The line pressure at point $b$ depends on the effective sectional area at the first flow restriction 40a, so that, when the effective sectional area of the first flow restriction 40a is made smaller, the line pressure acting on the differential area between the lands 34 and 36 slowly increases thereby to slowly move the valve spool 28 toward the right. Accordingly, the degree of communication between the outlet 42 and the first inlet 38 slowly decreases, thereby increasing the line pressure at point $b$ of the graph of FIG. 2. Thus, the line pressure at point $b$ can be modulated by varying the effective sectional area of the first flow restriction 40a.

It is to be noted that the fluid pressure in the pressurized fluid 26 is also permitted to directly flow through the second flow restriction 54a into the line pressure conduit 56 thereby to further increase the line pressure in the conduit 56, as shown by the line segment $b-c$ of the graph of FIG. 2. The increasing rate of such line pressure in the line pressure conduit 56 depends on the effective sectional area of the second flow restriction 54a. The valve spool 28 is moved rightwardly by the fluid pressure acting on the differential area between the lands 34 and 36 against the force of the spring 62 to decrease the overlap portion L, and is placed in the position where the force acting on the differential area between the lands 34 and 36 balances with the force of the spring 62. Under this condition, the line pressure in the line pressure conduit 56 is modulated to a level appropriate to effect smooth engagement of the friction elements. This level of the line pressure is illustrated by point $c$ of FIG. 2. The line pressure then remains constant by the force produced by the fluid pressure passed through the first and second flow restrictions 40a and 54a and acting on the differential area between the lands 34 and 36 balancing with the force of the spring 62, as shown by the line segment $c$—$d$ of FIG. 2.

When the output torque of the engine is small, the intake manifold vacuum of the engine is so high that the diaphragm member 98 is moved rightwardly against the force of the spring 96 to move the valve spool 80 in the same direction. In this instance, the effective sectional area of the port 86 is decreased by the land 82, thereby decreasing the fluid pressure passed to the port 76. The fluid pressure acting on the end of the land 68 is, in this instance, insufficient to move the valve spool 28 in the position between the outlet 42 and the first inlet 38, so that the line pressure increases to the value of point $e$ in the graph of FIG. 2. The line pressure is then gradually increased by means of the second flow restriction 54a in a manner shown by the broken line segment $e$—$f$ in FIG. 2. When the line pressure reaches a level corresponding to point $f$ in FIG. 2, the first land 30 of the regulator valve 12 establishes a communication between the first inlet 38 and the drain 44 so that the line pressure is kept constant.

Figure 3:
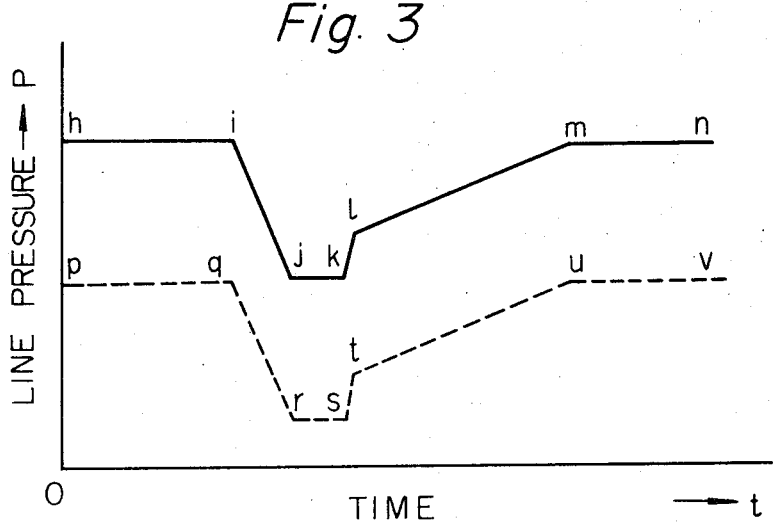
FIG. 3 in a graph showing examples of the variation of the line pressure obtainable where the regulator valve of the present invention is incorporated into an automatic power transmission.

FIG. 3 illustrates examples of the variation in the line pressures which is attained where the line pressure regulator valve 12 is incorporated into the power transmission, wherein a solid line indicates the line pressure at the higher output torque of the engine and a broken line indicates the line pressure at the lower output torque of the engine. In FIG. 3, the line segment $h$—$i$ indicates that the constant level of the line pressure is applied to one of the friction elements during driving condition of the vehicle. When the shift valve (not shown) is operated to change the flow path of the line pressure delivered from the line pressure conduit 56, the line pressure varies in a manner following the curve $i$—$j$—$k$—$l$ of FIG. 3 in this sequence. In this instance, the line pressure is drawn through the first inlet 38 and the outlet 42 into the conduit 56 and is applied to the friction elements. Points $k$ and $l$ correspond to points $a$ and $b$ of FIG. 2, respectively. When the outlet 42 is blocked by the second land 32 of the regulator valve 12, the fluid pressure is gradually supplied through the second flow restriction 54a to the conduit 52, so that the line pressure increases to a level corresponding to point $m$ of FIG. 3 and remains constant upon completion of coupling of the friction elements. Points $m$ and $n$ correspond to points $c$ and $d$ of FIG. 3, respectively. The line segment $p$—$q$ indicates that the friction elements receives a constant line pressure when the vehicle is running. When the shift valve is operated to shift the gear ratio, the line pressure decreases in agreement with the line segment $q$—$r$ and increases following the curve $s$—$t$—$u$. The friction elements are coupled when the line pressure varies in agreement with the segment $t$—$u$, thus providing smooth shifting of the gear ratio. Points $s$, $t$, $u$ and $v$ correspond to points $a$, $e$, $f$ and $g$ of FIG. 2, respectively.

It should now be appreciated that the regulator valve can be made simple in construction by virtue of the minimized number of orifices.

It should also be understood that the regulator valve implementing the present invention allows initially a relatively high rate of fluid flow to the friction elements and subsequently decreases the rate of fluid flow whereby a gradual engagement of the friction elements can be established to provide smooth shifting of the gear ratios.

What is claimed is:

1. A line pressure regulator valve for regulating line pressure in a hydraulic control system for an automotive automatic power transmission, comprising a valve body including first and second inlets communicating with a source of pressure fluid, an outlet communicating with a line pressure conduit connected to said hydraulic control system, and a drain to discharge an excess of fluid therethrough, a slidable valve spool having at least a first land and a second land, said first land varying the degree of fluid communication between said first inlet and said drain thereby varying the level of pressurized fluid to be delivered to said outlet, and said second land varying the degree of fluid communication between said first inlet and said outlet thereby varying the flow rate of pressurized fluid to be delivered to said line pressure conduit, spring means for biasing said valve spool in one direction so as to cause the first land thereof to decrease the degree of fluid communication between said first inlet and said drain and to cause the second land thereof to increase the degree of fluid communication between said first inlet and said outlet, amplifying means cooperating with said valve spool for varying the degree of fluid communication between said first inlet and said drain in accordance with a throttle pressure produced in said hydraulic control system so as to vary the level of pressurized fluid to be delivered to said outlet in accordance with said throttle pressure, conduit means communicating with said second inlet and said outlet and leading to said line pressure conduit, first flow restricting means provided in said second inlet for restricting the flow rate of pressurized fluid acting on said valve spool so as to gradually move said valve spool in another direction against the forces of said spring means and said amplifying means so as to cause said first land of said valve spool to increase the degree of fluid communication between said first inlet and said drain and to cause said second land of said valve spool to decrease the degree of fluid communication between said first inlet and said outlet, and second flow restricting means provided directly between said source of pressurized fluid and said conduit means for restricting the flow rate of pressurized fluid to be supplied to said line pressure conduit through said conduit means so as to gradually increasing the level of fluid pressure in said line pressure conduit, said valve spool being initially moved in said one direction by the action of said amplifying means to increase the degree of fluid communication between said first inlet and said outlet while decreasing the fluid communication between said first inlet and said drain thereby to allow a high level of fluid pressure to be passed into said conduit means at a relatively high rate, said high level of pressurized fluid delivered to said conduit means being applied through said first flow restricting means to said valve spool so as to cause the same to move in another direction thereby decreasing the degree of fluid communication between said first inlet and said outlet port for decreasing the flow rate pressurized fluid to be admitted to said line pressure conduit.

2. A line pressure regulator valve according to claim 1, wherein said slidable valve spool also has third and fourth lands, the pressurized fluid in said second inlet acting on a differential area between said third and fourth lands to move said valve spool in a direction against the forces of said means and said amplifying means.

3. A line pressure regulator valve according to claim 1, wherein said amplifying means includes a slidable valve spool having a push rod cooperating with said first land of said valve spool.

4. A line pressure regulator valve for regulating line pressure in a hydraulic control system for an automotive automatic power transmission which hydraulic control system includes a source of pressurized fluid and a throttle valve adapted to produce a throttle pressure in accordance with an engine output torque, said line pressure regulator valve comprising a valve body including first and second inlets communicating with said source of pressurized fluid, an outlet communicating with a line pressure conduit connected to said hydraulic control system, and a drain to discharge an excess of pressurized fluid therethrough, a slidable valve spool having first, second, third and fourth spaced lands formed thereon, said first land of said valve spool serving to vary the degree of fluid communication between said first inlet and said drain so as to vary the level of pressurized fluid to be delivered to said outlet, said second land of said valve spool serving to vary the degree of fluid communication between said first inlet and said outlet port so as to vary the flow rate of pressurized fluid to be admitted to said line pressure conduit, spring means for biasing said valve spool in one direction so as to cause the first land of said valve spool to decrease the degree of fluid communication between said first inlet and said drain and to cause said second land of said valve spool to increase the degree of fluid communication between said first inlet and said outlet, amplifying means having means cooperating with said first land of said valve spool and responsive to the throttle pressure produced by said throttle valve for moving said valve spool in said one direction so as to vary the level of pressurized fluid to be delivered to said outlet in accordance with the throttle pressure, conduit means communicating with said outlet and said second inlet and leading to said line pressure conduit, first flow restricting means provided in said second inlet for restricting the flow rate of pressurized fluid to be applied to said third and fourth lands of said valve spool for gradually moving said valve spool in another direction against the forces of said spring means and said amplifying means to cause said first land of said valve spool to increase the degree of fluid communication between said first inlet and said drain and to cause said second land of said valve spool to decrease the degree of fluid communication between said first inlet and said outlet, and second flow restricting means provided directly between said source of pressurized fluid and said conduit means for restricting the flow rate of pressurized fluid to be supplied to said line pressure conduit through said conduit means for gradually increasing the level of pressurized fluid in said line pressure conduit, said valve spool being initially moved in said one direction by the action of said amplifying means to increase the degree of fluid communication between said first inlet and said outlet ports thereby to allow initially a relatively high rate of fluid flow to said line pressure conduit through said conduit means and subsequently moved in said another direction by the pressurized fluid acting on the differential area between said third and fourth lands of said valve spool against the forces of said spring means and said amplifying means to decrease the degree of fluid communication between said first inlet and said outlet thereby to subsequently decrease the rate of fluid flow to be admitted to said line pressure conduit.

* * * * *